(12) United States Patent
Zhang

(10) Patent No.: US 11,907,931 B2
(45) Date of Patent: Feb. 20, 2024

(54) METHOD AND SYSTEM FOR MANAGING VIRTUAL ELECTRONIC CARD, SECURE CHIP, TERMINAL AND STORAGE MEDIUM

(71) Applicant: SHENZHEN GOODIX TECHNOLOGY CO., LTD., Shenzhen (CN)

(72) Inventor: Yanling Zhang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 159 days.

(21) Appl. No.: 17/473,278

(22) Filed: Sep. 13, 2021

(65) Prior Publication Data
US 2022/0253830 A1    Aug. 11, 2022

Related U.S. Application Data

(63) Continuation of application No. PCT/CN2021/075648, filed on Feb. 5, 2021.

(51) Int. Cl.
*G06Q 20/34* (2012.01)
*G06Q 20/32* (2012.01)

(52) U.S. Cl.
CPC ......... *G06Q 20/341* (2013.01); *G06Q 20/327* (2013.01); *G06Q 20/355* (2013.01); *G06Q 20/3563* (2013.01)

(58) Field of Classification Search
CPC .. G06Q 20/341; G06Q 20/327; G06Q 20/355; G06Q 20/3563
(Continued)

(56) References Cited

U.S. PATENT DOCUMENTS

| 8,196,131 B1 | 6/2012 | von Behren et al. |
| 10,664,824 B2 | 5/2020 | Wong et al. |

(Continued)

FOREIGN PATENT DOCUMENTS

| CN | 102087716 A | 6/2011 |
| CN | 104902463 A | 9/2015 |

(Continued)

OTHER PUBLICATIONS

"Practical Attack Scenarios on Secure Element-Enabled Mobile Devices," by Michael Roland and Josef Langer. 2012 4th International Workshop on Near Field Communication. IEEE, 2012. pp. 19-24. (Year: 2012).*

(Continued)

*Primary Examiner* — Sara C Hamilton
(74) *Attorney, Agent, or Firm* — Emerson, Thomson & Bennett, LLC; Roger D. Emerson; Matt J. Wilson

(57) ABSTRACT

A method for managing a virtual electronic card is applicable to a secure chip installed in a first terminal, and the method includes: receiving a management request from a trusted mobile application on the first terminal, the management request being used to manage a target virtual electronic card on the secure chip, and permissions of the virtual electronic card being configured by a chip operating system of the secure chip; determining, from the secure chip, a target card management program corresponding to the target virtual electronic card, the different virtual electronic cards corresponding to the different card management programs; sending the management request to the target card management program; and calling, through the target card management program, a card management command corresponding to the management request in a card management system on the secure chip, to manage the target virtual electronic card.

16 Claims, 3 Drawing Sheets

(58) Field of Classification Search
USPC .......................................................... 705/41
See application file for complete search history.

(56) References Cited

U.S. PATENT DOCUMENTS

| | | | |
|---|---|---|---|
| 2010/0063906 A1 | 3/2010 | Nelsen et al. | |
| 2013/0178159 A1 | 7/2013 | Xie et al. | |
| 2015/0033291 A1* | 1/2015 | Nicolau | H04W 12/04 |
| | | | 726/3 |
| 2015/0161382 A1* | 6/2015 | Boivie | G06K 19/06112 |
| | | | 726/28 |
| 2017/0076277 A1* | 3/2017 | Zhou | G06Q 20/3274 |
| 2020/0126064 A1* | 4/2020 | Chang | H04B 5/0037 |
| 2020/0286071 A1* | 9/2020 | Oepping | G06Q 20/24 |
| 2020/0387888 A1* | 12/2020 | Amiel | G06Q 20/18 |
| 2021/0192518 A1* | 6/2021 | Rule | G06Q 20/351 |
| 2022/0051228 A1* | 2/2022 | Guo | G06Q 20/3223 |
| 2022/0180351 A1* | 6/2022 | Zhou | G06Q 20/3278 |

FOREIGN PATENT DOCUMENTS

| | | | | |
|---|---|---|---|---|
| CN | 105550863 | | 5/2016 | |
| CN | 106845971 | | 6/2017 | |
| CN | 109146012 A | * | 1/2019 | |
| CN | 109547554 | | 3/2019 | |
| CN | 109801065 A | | 5/2019 | |
| CN | 110766388 A | | 2/2020 | |
| CN | 111124503 | | 5/2020 | |
| CN | 111443994 A | | 7/2020 | |
| CN | 112069848 A | * | 12/2020 | ....... G06K 19/07749 |
| CN | 112200564 A | | 1/2021 | |
| CN | 112200584 A | | 1/2021 | |
| EP | 2043016 A1 | | 4/2009 | |
| TW | I599971 B | * | 9/2017 | |
| WO | WO2009060393 A2 | | 5/2009 | |
| WO | WO2009156880 A1 | | 12/2009 | |
| WO | WO-2015085410 A1 | * | 6/2015 | ............. G06F 21/53 |
| WO | WO-2022099563 A1 | * | 5/2022 | ....... G06K 19/07749 |

OTHER PUBLICATIONS

"Promising Secure Element Alternatives for NFC Technology," by Marie Reveilhac and Marc Pasquet. 2009 1st International Workshop on Near Field Communication. IEEE, 2009. pp. 75-80. (Year: 2009).*

* cited by examiner

METHOD AND SYSTEM FOR MANAGING VIRTUAL ELECTRONIC CARD, SECURE CHIP, TERMINAL AND STORAGE MEDIUM

CROSS REFERENCE TO RELATED APPLICATIONS

The present disclosure is a continuation of international application No. PCT/CN 2021/075648, filed on Feb. 5, 2021, which is hereby incorporated by reference in its entirety.

TECHNICAL FIELD

The present disclosure relates to the field of near field communication technology, and in particular to a method and system for managing a virtual electronic card, a secure chip, a terminal, and a storage medium.

BACKGROUND

Near field communication (NFC) technology allows contactless point-to-point data transmission between devices. As NFC has high security, NFC-enabled terminals have developed rapidly. A terminal with NFC function may generate a virtual electronic card, and then interact with a card reader through the terminal to realize operations such as swiping bank cards, swiping bus cards, or swiping access cards. Since a card swiping operation can be realized without carrying a physical card, it can bring great convenience to a user.

Since each terminal with NFC function may generate a plurality of virtual electronic cards, in the process of generating, using and deleting the virtual electronic cards, it is necessary to manage the virtual electronic cards through card management programs. At present, for each virtual electronic card, at least two card management programs are required for management, in which at least one card management program is used to manage permissions of the virtual electronic card, and at least one card management program is used to manage programs in the virtual electronic card.

Regarding a method for managing a virtual electronic card in related technology, since each virtual electronic card needs to be managed by at least two card management programs, the card management programs used to manage the virtual electronic cards may occupy a large storage space of the chip. Thus, the terminal needs to be equipped with a chip with large storage space, to meet the needs of the user to use and manage a plurality of virtual electronic cards on the terminal, which will lead to an increase in the cost of the terminal.

SUMMARY

Embodiments of the present disclosure provide a method and system for managing a virtual electronic card, a secure chip, a terminal, and a storage medium, which can reduce occupation of chip storage space by a card management program of the virtual electronic card.

In a first aspect, an embodiment of the present disclosure provides a method for managing a virtual electronic card, applicable to a secure chip installed in a first terminal, and the method includes:

receiving a management request from a trusted mobile application on the first terminal, the management request being used to manage a target virtual electronic card in at least one virtual electronic card on the secure chip, and permissions of the virtual electronic card being configured by a chip operating system of the secure chip;

determining, from at least one card management program on the secure chip, a target card management program corresponding to the target virtual electronic card, each of the at least one of virtual electronic card corresponding to one of the at least one card management program, and different virtual electronic cards corresponding to different card management programs;

sending the management request to the target card management program; and calling, through the target card management program, a card management command corresponding to the management request in a card management system on the secure chip, to manage the target virtual electronic card.

In a first possible implementation, with reference to the above first aspect, the method further includes creating the target virtual electronic card, and the creating the target virtual electronic card includes:

acquiring an installation package of the card management program;

installing the target card management program on the secure chip based on the installation package; and calling, through the target card management program, a card creation command in the card management system, to create the target virtual electronic card on the secure chip.

In a second possible implementation, with reference to the above first possible implementation, the acquiring an installation package of the card management program, includes:

acquiring the installation package from a trusted service manager through the trusted mobile application.

In a third possible implementation, with reference to the above first possible implementation, the acquiring an installation package of the card management program, includes:

downloading the installation package from a preset device in a production stage of the secure chip.

In a fourth possible implementation, with reference to the above first possible implementation, after creating the target virtual electronic card on the secure clip, the method further includes:

allocating a target program identifier to the target card management program, wherein the different card management programs correspond to different program identifiers;

allocating a target card identifier to the target virtual electronic card, wherein the different virtual electronic cards correspond to different card identifiers; and registering a matching relationship between the target program identifier and the target card identifier in a registry of the chip operating system.

In a fifth possible implementation, with reference to the above fourth possible implementation, the determining, from at least one card management program on the secure chip, a target card management program corresponding to the target virtual electronic card, includes:

acquiring the target card identifier carried in the management request;

determining the target program identifier that matches the target card identifier, based on the matching relationship between the program identifier and the card identifier registered in the registry; and determining the card management program corresponding to the target program identifier as the target card management program corresponding to the target virtual electronic card.

In a sixth possible implementation, with reference to the above fifth possible implementation, the card management command includes a personalization command, a delete command, an activation command, or a read and write command;

the personalization command is used to instruct the target card management program to store personalization data carried in the management request in the target virtual electronic card;

the delete command is used to instruct the target card management program to delete the target virtual electronic card;

the activation command is used to instruct the target card management program to set the target virtual electronic card to a contactless activation status; and the read and write command is used to instruct the target card management program to read and write a content of the target virtual electronic card.

In a seventh possible implementation, with reference to the above sixth possible implementation, the personalization data is read from a physical card by a near field communication controller, the personalization data is sent to the trusted mobile application by the card management system, the personalization data is sent by the trusted mobile application to a trusted service manager, the trusted service manager generates the management request including the personalization data, and the trusted service manager sends the management request to the trusted mobile application.

In an eighth possible implementation, with reference to the above sixth possible implementation, the personalization data is sent to the trusted service manager by a second terminal, the trusted service manager generates the management request including the personalization data, and the trusted service manager sends the management request to the trusted mobile application, where the first terminal and the second terminal are different terminals.

In a ninth possible implementation, with reference to the above first aspect, the method for managing a virtual electronic card further includes:

receiving a contactless operation command from a near field communication controller, where the contactless operation command is generated based on near field communication between the near field communication controller and a contactless card reader;

executing the contactless operation command through the card management system to perform read and write operations on the target virtual electronic card;

acquiring feedback information after the card management system performs the read and write operations on the target virtual electronic card; and sending the feedback information to the near field communication controller.

In a tenth possible implementation, with reference to the above ninth possible implementation, after the receiving a contactless operation command from a near field communication controller, and before executing the contactless operation command through the card management system, the method further includes:

decrypting the contactless operation command through a serial peripheral interface SPI2;

transmitting the decrypted contactless operation command to a memory of the secure chip through a direct memory access (DMA) controller;

correspondingly, the sending the feedback information to the near field communication controller, includes:

transmitting the feedback information in the memory of the secure chip to a register of the serial peripheral interface SPI2 through the DMA controller;

encrypting the feedback information through the serial peripheral interface SPI2; and sending the encrypted feedback information to the near field communication controller.

In an eleventh possible implementation, with reference to the above first aspect or any one of the possible implementations of the first aspect, the card management system is implemented by C language, and the card management program is implemented by Java.

In a second aspect, an embodiment of the present disclosure also provides a secure chip, the secure chip being located in a terminal and connected to a memory in the terminal, the memory storing instructions executable by the secure chip, the instructions being executed by the secure chip, so that the secure chip can perform the method for managing a virtual electronic card provided by the above first aspect or any one of the possible implementations of the first aspect.

In a third aspect, an embodiment of the present disclosure also provides a terminal, including: the secure chip provided by the above second aspect, and a memory connected to the secure chip.

In a fourth aspect, an embodiment of the present disclosure also provides a computer readable storage medium storing a computer program, the computer program, when executed by a processor, implements the method for managing a virtual electronic card provided by the above first aspect or any one of the possible implementations of the first aspect.

In a fifth aspect, an embodiment of the present disclosure also provides a system for managing a virtual electronic card, including: the secure chip provided by the above second aspect and a trusted mobile application;

the trusted mobile application is installed on a first terminal where the secure chip is located; and the trusted mobile application is configured to send a management request to the secure chip, where the management request is used to instruct a card management program on the secure chip to manage the virtual electronic card on the secure chip, and different card management programs are used to manage different virtual electronic cards.

In a first possible implementation, with reference to the above fifth aspect, the system for managing a virtual electronic card further includes: a trusted service manager;

the trusted mobile application is further configured to send an acquisition instruction to the trusted service manager, where the acquisition instruction is used to request to acquire an installation package of the card management program;

the trusted service manager is configured to send the installation package to the trusted mobile application based on the acquisition instruction; and the trusted mobile application is further configured to send the received installation package to the secure chip.

In a second possible implementation, with reference to the above fifth aspect, the system for managing a virtual electronic card further includes: a preset device;

the preset device is configured to send a download instruction to the secure chip in a production stage of the secure chip, where the download instruction is used to instruct the secure chip to download the installation package of the card management program from the preset device.

In a third possible implementation, with reference to the above first possible implementation, the system for managing a virtual electronic card further includes: a near field communication controller;

the near field communication controller is provided in the first terminal;

the near field communication controller is configured to generate a contactless operation command based on near field communication between the near field communication controller and a contactless card reader, and send the contactless operation command to the secure chip; and the near field communication manager is further configured to receive feedback information after the secure chip executes the contactless operation command, and send the feedback information to the contactless card reader through near field communication.

In a fourth possible implementation, with reference to the above third possible implementation, the near field communication controller is further configured to read personalization data from a physical card, and send the read personalization data to the trusted mobile application;

the trusted mobile application is further configured to send the received personalization data to the trusted service manager; and the trusted service manager is further configured to generate the management request including the received personalization data.

In a fifth possible implementation, with reference to the above third possible implementation, the trusted service manager is further configured to receive personalization data from a second terminal, and generate the management request including the received personalization data.

Through the solution for managing a virtual electronic card provided by the embodiments of the present disclosure, at least one virtual electronic card is created on the secure chip, each virtual electronic card corresponds to one card management program on the secure chip, and different virtual electronic cards correspond to different card management programs. When a virtual electronic card needs to be managed, a management request from the trusted mobile application on the terminal where the secure chip is located is received, and the management request is sent to the corresponding card management program. The card management program calls a card management command in the card management system on the secure chip to manage the virtual electronic card that needs to be managed. Since permissions of a plurality of virtual electronic cards are configured by the chip operating system of the secure chip, and other management of the virtual electronic cards may be realized through the corresponding card management programs, each virtual electronic card only needs to be managed by one card management program, which can reduce occupation of chip storage space by the card management program of the virtual electronic card.

BRIEF DESCRIPTION OF THE DRAWINGS

In order to more clearly illustrate the technical solution in the embodiments of the present disclosure or the prior art, the following will briefly introduce the accompanying drawings that need to be used in the description of the embodiments or the prior art. Obviously, the accompanying drawings in the following description are some embodiments of the present disclosure. For those of ordinary skill in the art, other accompanying drawings may also be obtained based on these accompanying drawings without creative work.

DETAILED DESCRIPTION OF EMBODIMENTS

Figure 1:
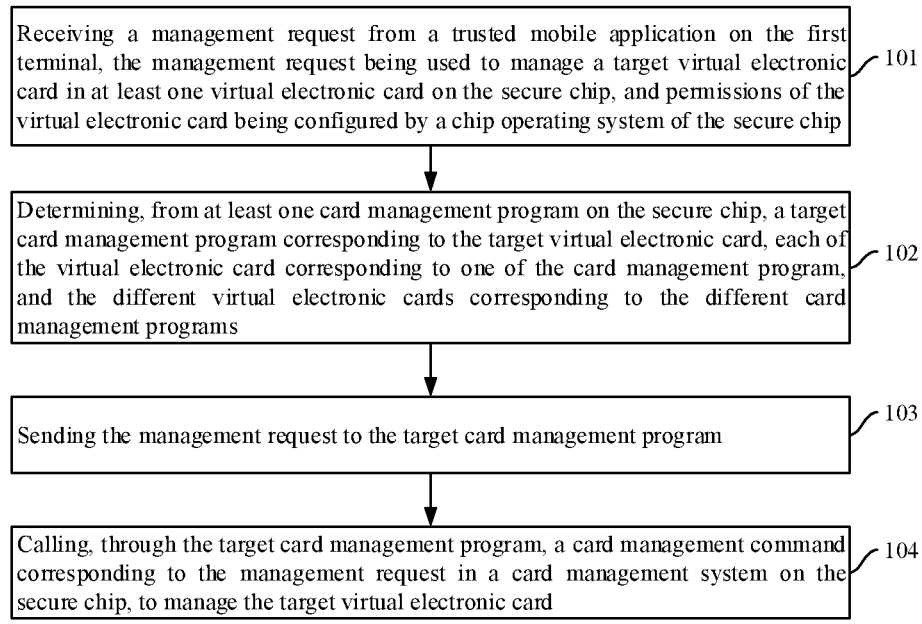
FIG. 1 is a flowchart of a method for managing a virtual electronic card provided by an embodiment of the present disclosure.

In order to make the objectives, technical solutions, and advantages of embodiments of the present disclosure clearer, the various embodiments of the present application will be described in detail below in conjunction with the accompanying drawings. However, those of ordinary skill in the art may understand that in the embodiments of the present disclosure, many technical details are proposed in order to enable the reader to better understand the present disclosure. However, even without these technical details and various changes and modifications based on the following embodiments, the technical solution claimed in the present disclosure may be realized. The following division of the various embodiments is for convenience of description, and should not constitute any limitation on the specific implementations of the present disclosure, and the various embodiments may be combined with each other on a non-conflict basis.

An embodiment of the present disclosure provides a method for managing a virtual electronic card, applicable to a secure chip. The secure chip may be a secure element (SE), and more specifically, may be an embedded secure element (eSE). In a specific implementation, the secure chip may be set in a terminal, and the terminal may be an electronic device such as a smart phone, a smart band, or a smart watch. An application scenario of the embodiment of the present disclosure may be: a user manages a virtual electronic card simulated by a terminal through a secure chip. The virtual electronic card simulated by the terminal includes, but is not limited to: a bank card, a bus card, an access card. Implementation details of the method for managing a virtual electronic card provided in the embodiments of the present disclosure will be described in detail below. The following content is only implementation details provided for ease of understanding, and is not necessary for the implementation of this solution.

Before introducing the embodiments of the present disclosure, first, a brief introduction to the virtual electronic card simulated by a mobile phone terminal is given:

Conventional smart cards, such as bus cards, bank cards, or medical insurance cards, may be read for data and swiped by various card readers because they contain chips inside. There are two types of chips commonly used in smart cards, one is contact card swiping, such as common card-inserted POS machines, and the other is contactless card swiping, which contains a contactless data transmission control chip (including supporting antenna) similar to NFC, such as common bus cards swiped near a card reader. These common physical card functions are simulated through the mobile phone terminal, which is called virtual electronic cards. In this regard, there is no real card, just adding relevant information or program of a card in the mobile phone terminal to "simulate" a smart card, so that the same mobile phone terminal may realize simulation of a variety of cards and a plurality of cards through cooperation of an NFC chip and the secure element, which is equivalent to installing a plurality of smart cards on the mobile phone. It may be simply understood that information used to simulate a plurality of cards is stored in the secure element, and the NFC chip connected to the secure element interacts for information with an external card reader to realize a card swiping function. Through these "simulated cards" (virtual electronic cards), the same mobile phone terminal may be used on different occasions to realize card swipe authentication, card swipe consumption and other behaviors of different cards.

FIG. 1 is a flowchart of a method for managing a virtual electronic card provided by an embodiment of the present disclosure. The method is applicable to a secure chip, and the secure chip is installed in a first terminal. Referring to FIG. 1, the method includes the following steps:

Step 101: receiving a management request from a trusted mobile application on the first terminal, the management request being used to manage a target virtual electronic card in at least one virtual electronic card on the secure chip, and permissions of the virtual electronic card being configured by a chip operating system of the secure chip.

The trusted mobile application is installed on the first terminal including the secure chip, one or more virtual electronic cards are created on the secure chip, and the trusted mobile application sends the management request to the secure chip, in response to a user's card management operation on the selected virtual electronic card, to manage the virtual electronic card selected by the user. The permissions of the virtual electronic card on the secure chip are configured by the chip operating system of the secure chip. The chip operating system may perform operating system functions other than OPEN (functions of Global Platform) to realize memory supervision, permission management, etc., thereby realizing permission configuration of the virtual electronic card.

The trusted mobile application may provide a human-computer interaction interface to facilitate the user to manage the virtual electronic card on the first terminal. In an example, the trusted mobile application is a wallet application. Through the human-computer interaction interface provided by the trusted mobile application, the user may "select" any virtual electronic card on the interface and trigger a card management option, which indicates that the trusted mobile application initiates the management request and the "selected" virtual electronic card is a target virtual electronic card. For example, the human-computer interaction interface provided by the trusted mobile application displays three virtual electronic cards: transport card A, transport card B, and an access card. After selecting the transport card B on the human-computer interface, the user triggers a "recharge" button on the human-computer interaction interface. In this regard, the trusted mobile application may initiate a management request for the transport card B.

The trusted mobile application may realize communicate between a near field communication controller (NFCC), the secure chip, and a trusted service manager (TSM) through a software interface provided by an Android system architecture. The Android system architecture provides an open mobile application program interface (Open Mobile API, OMAPI) framework, provides an interface for the trusted service manager to report read virtual electronic card information, an interface for receiving a message flow of the trusted service manager, and an interface that transmits instructions of an application protocol data unit (APDU) to a card management program in the secure chip.

In a possible implementation, the trusted mobile application generates the management request for the target virtual electronic card in response to the card selection operation and the card management operation of the user, and sends the generated management request to the secure chip. In another possible implementation, the trusted mobile application uploads data to the trusted service manager, in response to the user's operation or feedback from the secure chip. The trusted service manager generates the management request based on the data uploaded by the trusted mobile application, and sends the generated management request to the trusted mobile application. Then, the trusted mobile application sends the received management request to the secure chip.

Step 102: determining, from at least one card management program on the secure chip, a target card management program corresponding to the target virtual electronic card, each of the at least one virtual electronic card corresponding to one of the at least one card management program, and different virtual electronic cards corresponding to different card management programs.

At least one virtual electronic card is created on the secure chip, and the corresponding card management program is installed on the secure chip for each virtual electronic card. Different virtual electronic cards correspond to different card management programs, and the card management program is used to manage the corresponding virtual electronic card. After receiving the management request for the target virtual electronic card, first, the target card management program corresponding to the target virtual electronic card is determined, so that the target card management program manages the target virtual electronic card in response to the management request.

Step 103: sending the management request to the target card management program.

After a target card management request for managing the target virtual electronic card is determined, the management request for the target virtual electronic card is sent to the target card management program. In a possible implementation, the chip operating system of the secure chip receives the management request from the trusted mobile application, and forwards the received management request to the target card management program.

Step 104: calling, through the target card management program, a card management command corresponding to the management request in a card management system on the secure chip, to manage the target virtual electronic card.

The card management system is deployed in the secure chip. The card management system provides a variety of card management commands for managing the virtual electronic card. The card management system receives the calling of card management command from the card management program, executes the called card management command, and realizes managing the virtual electronic card.

After receiving the management request, the target card management program calls the corresponding card management command in the card management system based on the management request, so that the card management system executes the card management command to manage the target virtual electronic card. The management of the target virtual electronic card includes personalizing the target virtual electronic card, deleting the target virtual electronic card, activating the target virtual electronic card, and reading and writing the target virtual electronic card. Here, personalization refers to writing personalization data into the virtual electronic card, so that the virtual electronic card realizes function of a card such as a bank card, a bus card, or an access card. In addition, different virtual electronic cards may be distinguished based on the written personalization data. For example, for a transport card of a certain place, information such as card number, recharge amount, or validity period may be written into a newly created virtual electronic card, so that the virtual electronic card realizes the function of the transport card, and then the virtual electronic card may be used for card swiping to board a bus, take a subway, and so on.

Through the solution for managing a virtual electronic card provided by the embodiment of the present disclosure, at least one virtual electronic card is created on the secure chip, each virtual electronic card corresponds to one card management program on the secure chip, and different virtual electronic cards correspond to different card management programs. When a virtual electronic card needs to be managed, a management request from the trusted mobile application on the terminal where the secure chip is located is received, and the management request is sent to the corresponding card management program. The card management program calls a card management command in the card management system on the secure chip to manage the virtual electronic card that needs to be managed. Since permissions of a plurality of virtual electronic cards are configured by the chip operating system of the secure chip, and other management of the virtual electronic cards may be realized through the corresponding card management programs, each virtual electronic card only needs to be managed by one card management program, which can reduce occupation of chip storage space by the card management program of the virtual electronic card.

Alternatively, based on the method for managing a virtual electronic card as shown in FIG. 1, the card management program on the secure chip may not only be used to manage a virtual electronic card, but also may be used to create a virtual electronic card. For this purpose, before creating a virtual electronic card on the secure chip, a card management program needs to be installed on the secure chip first, and an installation package used by the user to install the card management program may have different sources. In the following, taking the installation package of the card management program acquired from the trusted service manager and a preset device as examples, the method for managing a virtual electronic card provided in the embodiments of the present disclosure will be described in detail.

Figure 2:
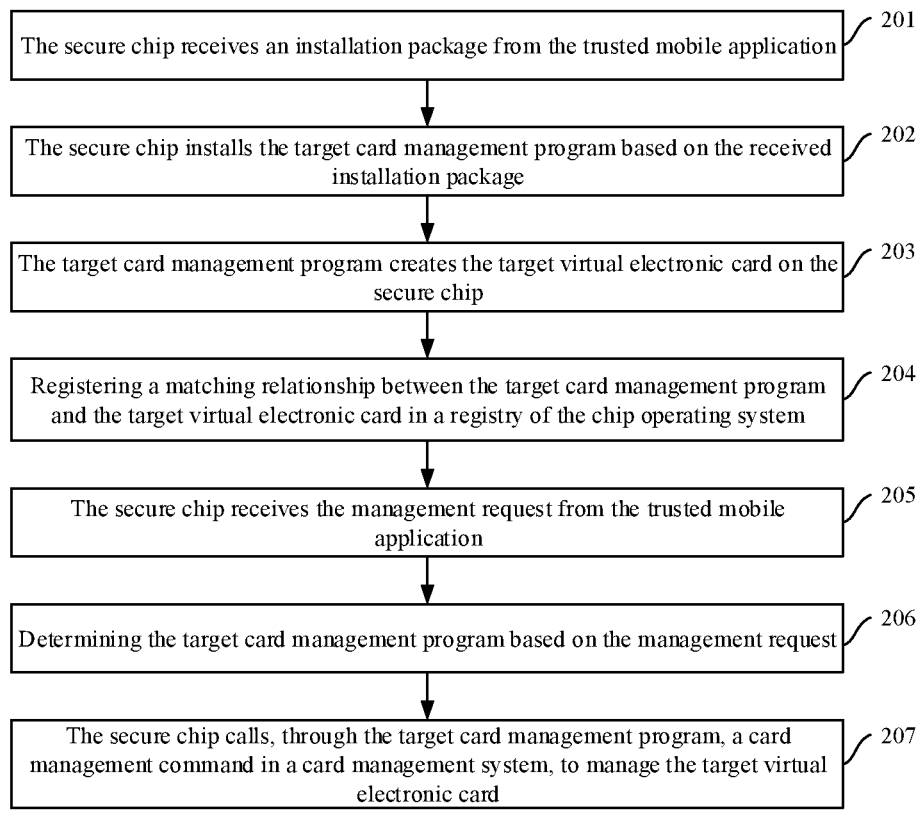
FIG. 2 is a flowchart of another method for managing a virtual electronic card provided by an embodiment of the present disclosure.

FIG. 2 is a flowchart of a method for managing a virtual electronic card provided by an embodiment of the present disclosure. The method is applicable to a secure chip. Referring to FIG. 2, the method installs the card management program through the trusted service manager and manages the virtual electronic card through the trusted mobile application, and specifically includes the following steps:

Step 201: The secure chip receives an installation package from the trusted mobile application.

When the user needs to create the target virtual electronic card on the terminal, the trusted mobile application installed on the terminal sends an acquisition instruction to the trusted service manager in response to the user's operation to acquire the installation package of the card management program from the trusted service manager. Then, the trusted mobile application may send the acquired installation package to the secure chip on the terminal. For example, the trusted mobile application may download the installation package through a LOAD instruction of Global Platform (GP), and the installation package may be a CAP package.

The trusted mobile application accesses a backend of the trusted service manager through a service interface of the trusted service manager, acquires a list of available virtual electronic cards, and displays the acquired list of available virtual electronic cards on a human-computer interaction interface. The user selects the target virtual electronic card to be created from the list of available virtual electronic cards. Then, the trusted mobile application acquires the installation package of the card management program from the trusted service manager, and sends the acquired installation package to the secure chip.

It should be noted that different virtual electronic cards correspond to different card management programs. Each virtual electronic card is created and managed by the corresponding card management program. Since the card management program manages the virtual electronic card in basically the same method, different card management programs may be installed through the same or different installation packages. In a possible implementation, different card management programs are installed through a universal installation package. The different card management programs are configured differently, such as recording a matching relationship between the virtual electronic card and the card management program in a registry of the secure chip, to realize the creation and management of different virtual electronic cards by the different card management programs. The installation package stored on the trusted service manager may be uploaded by a manufacturer of the secure chip.

In addition, it should be noted that since a plurality of virtual electronic cards may be created on the same terminal, each virtual electronic card needs to be created and managed through the corresponding card management program, and different card management programs may be installed through the same installation package. Therefore, when a virtual electronic card is created on the terminal for the first time, the installation package of the card management program may be acquired from the trusted service manager, and the acquired installation package is stored in the secure chip. Later, when a virtual electronic card is created on the terminal again, a card management program may be installed directly using the installation package stored in the secure chip. For example, transport card A of city A is a first virtual electronic card created on a terminal. When creating the transport card A, an installation package of a card management program may be acquired from a trusted service manager, and the installation package is stored on the secure chip in the terminal. Later, when transport card B (virtual electronic card) of city B needs to be created on the terminal, a card management program B for creating and managing the transport card B may be created based on the installation package stored on the secure chip, and then the transport card B is created and managed on the secure chip through the card management program B.

Step 202: The secure chip installs the target card management program based on the received installation package.

After receiving the installation package of the card management program, the chip operating system (COS) of the secure chip calls a program installation command in the card management system on the secure chip to install the target card management program on the secure chip based on the acquired installation package. For example, after the chip operating system acquires the installation package of the card management program, the terminal first establishes a secure channel using a secure algorithm (such as SCP02, SCP03), and then executes an INSTALL instruction of the Global Platform. After receiving the INSTALL instruction, the chip operating system creates the card management program in the secure chip based on the installation package, and uses the created card management program as the target card management program.

Step 203: The target card management program creates the target virtual electronic card on the secure chip.

After installing the target card management program on the secure chip, the target card management program may call a card creation command in the card management system on the secure chip, and the card management system executes the card creation command to create the target virtual electronic card in a virtual electronic card storage area on the secure chip. As a communication medium between the virtual electronic card and the card management program, the card management system provides commands for creating and managing the virtual electronic card. The card management programs call the commands provided by the card management system to manage the virtual electronic cards.

Step 204: registering a matching relationship between the target card management program and the target virtual electronic card in a registry of the chip operating system.

After installing the target card management program on the secure chip, a target program identifier is allocated to the target card management program, where different card management programs correspond to different program identifiers. After the target virtual electronic card is created on the secure chip, a target card identifier is allocated to the target virtual electronic card, where different virtual electronic cards correspond to different card identifiers. After obtaining the target program identifier and the target card identifier, a matching relationship between the target program identifier and the target card identifier is registered in the registry of the chip operating system of the secure chip.

Since a plurality of virtual electronic cards may be created on the secure chip, and different virtual electronic cards need to be managed by different card management programs, by allocating the card identifier to each virtual electronic card and the program identifier to each card management program, and registering the matching relationship between the card identifier and the program identifier in the registry of the chip operating system, when the user needs to manage one of the virtual electronic cards, the chip operating system may determine the program identifier that matches the card identifier of the to-be-managed virtual electronic card based on the matching relationship between the card identifier and the program identifier in the registry, and then may determine the card management program used to manage the to-be-managed virtual electronic card based on the determined program identifier, so that the plurality of virtual electronic cards can be managed accurately.

It should be noted that when the chip operating system creates the card management program through the INSTALL instruction, it is necessary to ensure that parameters of the virtual electronic card configured based on the INSTALL instruction do not conflict, to avoid installation failure of the card management program and the virtual electronic card, and also avoid subsequent contactless communication failures. The parameters of the virtual electronic card configured based on the INSTALL instruction include the program identifier, and a unique identifier (UID) of the virtual electronic card required for contactless communication, SAK (Select Acknowledge), ATQA (Answer To request, Type A), etc.

Step 205: The secure chip receives the management request from the trusted mobile application.

When the target virtual electronic card created on the terminal needs to be managed, the trusted mobile application installed on the terminal sends the management request for the target virtual electronic card to the secure chip, and the chip operating system of the secure chip receives the management request for the target virtual electronic card.

The trusted mobile application may generate the management request for the target virtual electronic card in response to the user's trigger, and then transmit the generated management request to the secure chip located on the same terminal. Alternatively, the trusted mobile application may receive the management request for the target virtual electronic card from the trusted service manager, and then forward the received management request to the secure chip located on the same terminal.

Step 206: determining the target card management program based on the management request.

After receiving the management request, the chip operating system of the secure chip first determines the virtual electronic card targeted by the received management request, that is, determines which virtual electronic card the received management request is to manage. Since different card management programs are used to manage different virtual electronic cards, after receiving the management request for the target virtual electronic card, the target card management program used to manage the target virtual electronic card needs to be determined first, and then the management request is sent to the target card management program, and the target virtual electronic card is managed by the target card management program. In a possible implementation, the target card management program used to manage the target virtual electronic card may be determined in the following method:

S1: acquiring the target card identifier carried in the management request.

When the trusted mobile application or the trusted service manager generates the management request, it may add the card identifier of the to-be-managed target virtual electronic card in the management request. Therefore, the management request not only carries a specific management instruction and corresponding management information, but also carries the card identifier of the target virtual electronic card. After receiving the management request, the chip operating system of the secure chip obtains the target card identifier carried in the management request by analyzing the management request.

S2: determining the target program identifier that matches the target card identifier, based on the matching relationship between the program identifier and the card identifier registered in the registry.

As described in step 204 above, for each virtual electronic card created on the terminal, a card identifier is allocated to the virtual electronic card, and a program identifier is also allocated to the card management program used to manage the virtual electronic card. Moreover, different virtual electronic cards correspond to different card identifiers, and different card management programs correspond to different program identifiers. In the registry of the chip operating system, the matching relationship between the card identifier and the program identifier is recorded. If a card management program X is used to manage a virtual electronic card X, the program identifier of the card management program X and the card identifier of the virtual electronic card X are registered as a matching relationship in the registry of the chip operating system.

After obtaining the target card identifier carried in the management request, the chip operating system of the secure chip determines the program identifier that matches the target card identifier, based on the matching relationship between the program identifier and the card identifier registered in the registry of the chip operating system, and then determines the determined program identifier as the target program identifier.

S3: determining the target card management program based on the target program identifier.

After determining the target program identifier, the chip operating system of the secure chip determines a card management program corresponding to the target program identifier as the target management program, that is, the determined target card management program is used to manage the target virtual electronic card targeted by the management request. After the target card management program is determined, the target card management program may determine a type of management for the target virtual electronic card based on the management request, and then call a corresponding card management command in the card management system to perform the corresponding type of management on the target virtual electronic card.

Step 207: The secure chip calls, through the target card management program, a card management command in a card management system, to manage the target virtual electronic card.

After determining the target card management program for managing the target virtual electronic card, the chip operating system sends the management request to the target card management program. After receiving the management request, the target card management program calls the card management command in the card management system on the secure chip to manage the target virtual electronic card.

In a possible implementation, for the received management request, the chip operating system of the secure chip may determine the card management program used to manage the virtual electronic card targeted by the management request in the following method:

In a possible implementation, the card management command in the card management system may be a personalization command, a delete command, an activation command, or a read and write command. The personalization command is used to instruct the corresponding card management program to store personalization data in the corresponding virtual electronic card. The delete command is used to instruct the corresponding card management program to delete the corresponding virtual electronic card from the secure chip. The activation command is used to instruct the corresponding card management program to set the corresponding virtual electronic card to a contactless activation status. The read and write command is used to instruct the corresponding card management program to read and write a content of the corresponding virtual electronic card.

For the personalization command: The terminal may update the user's data to the virtual electronic card through PERSONALIZATION and STORE DATA standard instructions of the Global Platform. When the chip operating system of the secure chip receives the STORE DATA instruction (management request), the chip operating system may transmit the STORE DATA instruction to the card management program with the corresponding program identifier. After receiving the STORE DATA instruction, the card management program calls the personalization command in the card management system on the secure chip using a Process data method, and stores the personalization data in the corresponding virtual electronic card.

For the delete command: When the chip operating system of the secure chip receives a DELETE instruction (management request), the chip operating system may transmit the DELETE instruction to the card management program with the corresponding program identifier. After receiving the DELETE instruction, the card management program calls the delete command in the card management system on the secure chip using an uninstall method to delete the virtual electronic card corresponding to the corresponding card identifier, to release storage space corresponding to the deleted virtual electronic card. Since storage space allocated by the chip operating system to each virtual electronic card has an upper limit, deleting the virtual electronic card created on the secure chip through the management request may realize reuse of the storage space of the virtual electronic card on the secure chip. In addition to deleting the virtual electronic card on the secure chip, the installation package of the card management program stored on the secure chip may also be deleted.

For the activation command: The terminal sets the contactless activation status of the virtual electronic card through a SET STATUS instruction of a contactless registry service (CRS) application of the Global Platform. After the SET STATUS instruction is executed for a virtual electronic card, the virtual electronic card is normally activated, and the virtual electronic card may perform contactless communication normally. When receiving the SET STATUS instruction (management request), the chip operating system of the secure chip may transmit the SET STATUS instruction to the card management program with the corresponding program identifier. After receiving the SET STATUS instruction, the card management program calls the activation command in the card management system on the secure chip, and selects the virtual electronic card with the corresponding card identifier for subsequent contactless communication.

The chip operating system of the secure chip may record registration information of each card management program, and the contactless activation status of the virtual electronic card is stored in the registry of the chip operating system. The chip operating system of the secure chip allows a plurality of virtual electronic cards to be activated at the same time. It is only necessary to ensure that installation parameters of the virtual electronic cards do not conflict, but at the same time, the chip operating system of the secure chip may only communicate with one virtual electronic card corresponding to the card management program selected by the trusted mobile application or the contactless card reader. The installation parameter of the virtual electronic card includes the UID. The installation parameter of the virtual electronic card may be set for conflict judgment. If it is set that conflict judgment is required, when the chip operating system of the secure chip calculates a conflict, virtual electronic cards with the same UID cannot be activated at the same time.

For the read and write command: The card management system on the secure chip provides an interface, the terminal reads and writes the content of the virtual electronic card through the card management program, and instructions for reading and writing the content of the virtual electronic card are all implemented in a Process method of the card management program. The terminal selects the card management program through a standard SELECT instruction of the Global Platform. The selected card management program responds to a read and write APDU instruction (management request). Then, the card management program calls the read and write command in the card management system in the Process method, to read and write the virtual electronic card with the corresponding card identifier.

In an embodiment of the present disclosure, when the target card management program calls the personalization command in the card management system to personalize the target virtual electronic card, the management request generated by the trusted service manager includes the personalization data. The personalization data may include card number, balance, card swiping record and other information. The personalization data in the management request may be uploaded to the trusted service manager by the first terminal, or may be uploaded to the trusted service manager by a second terminal different from the first terminal.

In a possible implementation, a near field communication controller on the terminal may read the personalization data from a physical card, and the card management system may send the personalization data read by the near field communication controller to the trusted mobile application on the terminal. The trusted mobile application on the terminal may send the received personalization data to the trusted service manager, and then the trusted service manager may generate the management request including the personalization data.

The trusted mobile application on the terminal reads the personalization data in the physical card through the near field communication controller, then the trusted mobile application uploads the read personalization data to the trusted service manager through the terminal, the trusted service manager sends the personalization data to the secure chip through the trusted mobile application, and a newly installed card management program in the secure chip may store the personalization data in a newly created virtual electronic card to complete the personalization of the virtual electronic card. By reading the personalization data from the physical card, uploading the personalization data to the trusted service manager, then sending the personalization data to the secure chip by the trusted service manager, a function of copying the physical card may be realized. A physical access card, a loyalty card, etc. may be converted into a virtual electronic card on the terminal, which can improve user experience.

In another possible implementation, the trusted service manager may receive the personalization data uploaded by the second terminal, and then the trusted service manager may generate the management request including the personalization data, and send the generated management request to the first terminal, where the first terminal and the second terminal are different terminals.

In the trusted mobile application on the terminal, a management page of each virtual electronic card has a sub-interface that can be moved into. The sub-interface displays the personalization data that can be moved into on the trusted service manager through a list. When moving into the virtual electronic card, the personalization data on the trusted service manager may be downloaded to the terminal through the trusted mobile application. When moving out of the virtual electronic card, the personalization data of the virtual electronic card in the secure chip may be uploaded to the trusted service manager through the trusted mobile application for subsequent moving in use.

Through the trusted mobile application on the terminal, the personalization data of the virtual electronic card installed on the terminal may be uploaded to the trusted service manager, and the personalization data stored on the trusted service manager may also be downloaded to the trusted mobile application. In this way, a function of moving in and out of a plurality of virtual electronic cards between different mobile phones is realized, so that the user may move the virtual electronic cards on an original mobile phone to a new mobile phone after changing the mobile phone, thereby further improving the user experience.

In an embodiment of the present disclosure, the card management program may not only manage the virtual electronic card based on the management request, but also may participate in a contactless operation of the virtual electronic card. The near field communication controller performs near field communication with the contactless card reader to generate a contactless operation command. The near field communication controller sends the contactless operation command to the secure chip. After receiving the contactless operation command from the near field communication controller, the secure chip executes the contactless operation command through the card management system on the secure chip, to perform read and write operations on the target virtual electronic card, and send feedback information for the read and write operations on the target virtual electronic card to the near field communication controller.

When the virtual electronic card is successfully created and activated, the contactless card reader may authenticate, read, and write the virtual electronic card through NFC. The card management system on the secure chip may receive the contactless operation command from the near field communication controller. Then, the card management system may execute the received contactless operation command, and send the feedback information for the read and write operations on the corresponding virtual electronic card to the near field communication controller, to ensure that each virtual electronic card on the terminal can perform contactless operation normally, thereby ensuring the convenience and experience of the user's card swiping operation through the terminal.

In a possible implementation, after receiving the contactless operation command from the near field communication controller, the secure chip may decrypt the contactless operation command through a serial peripheral interface SPI2, then transmit the decrypted contactless operation command to a memory of the secure chip through a direct memory access (DMA) controller. Then, the card management system on the secure chip may execute the contactless operation command in the memory. Correspondingly, after performing read and write operations on the virtual electronic card, the card management system may store the feedback information for the read and write operations on the virtual electronic card in the memory of the secure chip, then transmit the feedback information in the memory of the secure chip to a register of the serial peripheral interface SPI2 through the DMA controller, then encrypt the feedback information through the serial peripheral interface SPI2, and then send the encrypted feedback information to the near field communication controller.

It should be noted that the serial peripheral interface SPI2 is a hardware interface in the secure chip. Compared with a serial peripheral interface SPI, the serial peripheral interface SPI2 not only has a data transmission function, but also has a function of encrypting and decrypting data streams. The secure chip communicates with the near field communication controller through the serial peripheral interface SPI2. The secure chip may also communicate with other components in the first terminal through the serial peripheral interface SPI2, such as communicating with a central processing unit (CPU) of the first terminal.

The DMA controller transmits the contactless operation command decrypted by the serial peripheral interface SPI2 to the memory of the secure chip, and also transmits the feedback information in the secure chip to the register of the serial peripheral interface SPI2. The memory of the secure chip generally refers to memory space of the secure chip, and the virtual electronic card, the card management program, the card management system, and the chip operating system in the embodiments of the present disclosure are all implemented in the memory of the secure chip.

The contactless communication of the virtual electronic card is based on an SPI2 protocol and performed between the chip operating system and an operating system of the near field communication controller. The authentication, read and write instructions of the virtual electronic card are encapsulated in an SPI2 instruction frame. After the chip operating system receives the contactless operation command of the operating system of the near field communication controller, first the contactless operation command is encrypted and decrypted by the SPI2 and then transferred to DMA. DMA directly transfers the data to the memory of the secure chip without passing through the CPU, and then starts an interrupt service program. The card management system executes to process the contactless operation command of the virtual electronic card, to perform read operation or write operation on the virtual electronic card. After the contactless operation command is processed and completed, the returned feedback information is directly transferred from the memory of the secure chip to the register of the SPI2 via DMA, and sent to the operating system of the near field communication controller after the SPI2 encryption and decryption operations.

Data transmission between the near field communication controller and the secure chip is performed through DMA. DMA directly transfers the data to the memory of the secure chip without passing through the CPU, which may increase a processing speed of the secure chip for the contactless operation command and shorten waiting time when the user swipes the virtual electronic card, so as to improve the user experience. When data transmission is performed between the near field communication controller and the secure chip, the transmitted data is encrypted and decrypted through the SPI2 to ensure that the data is in an encrypted state during the data transmission, and ensure security of the user when swiping the virtual electronic card.

Figure 3:
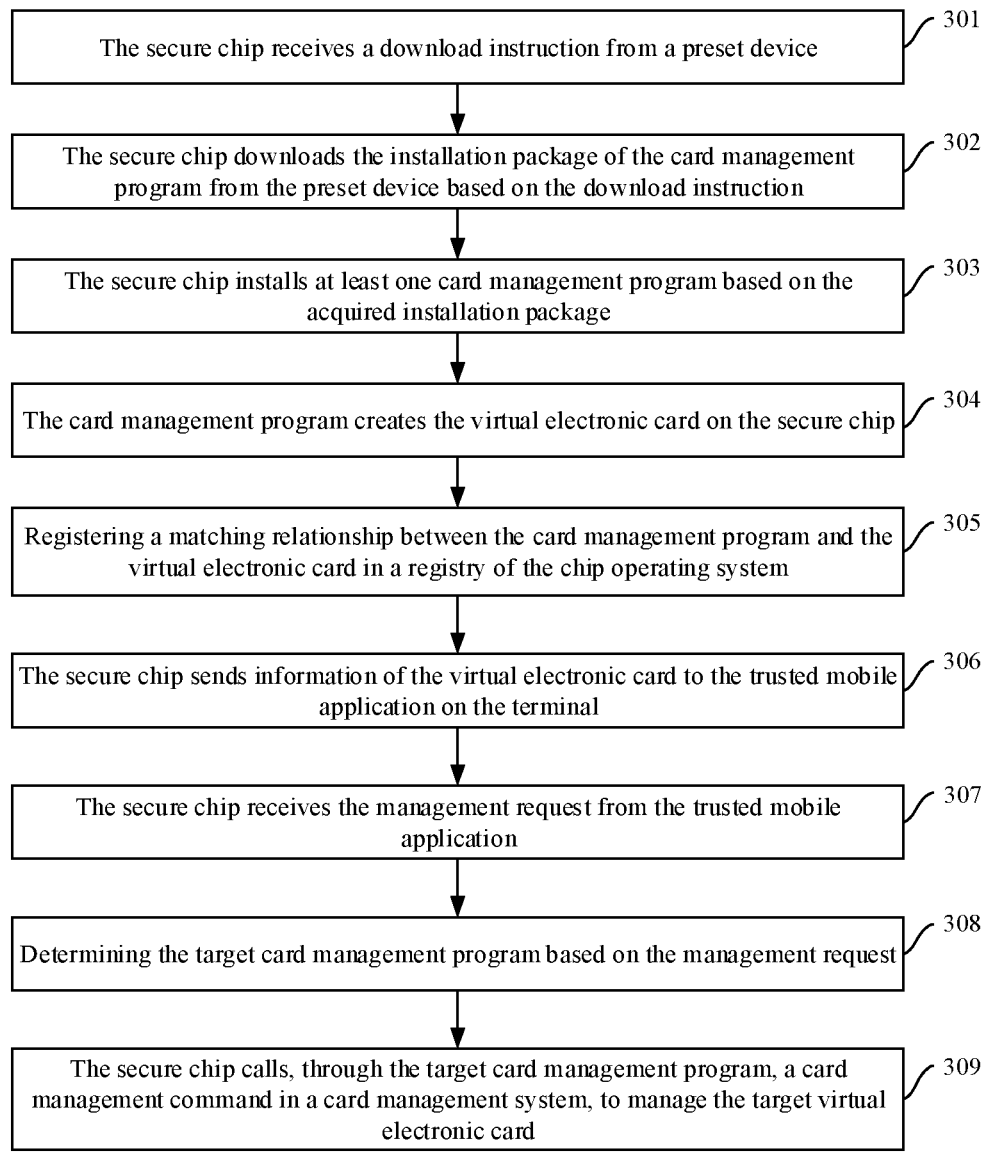
FIG. 3 is a flowchart of yet another method for managing a virtual electronic card provided by an embodiment of the present disclosure.

In the embodiment shown in FIG. 2, the secure chip acquires the installation package of the card management program from the trusted mobile application, and the trusted mobile application acquires the installation package of the card management program from the trusted service manager. In this regard, it corresponds to an application scenario of creating a virtual electronic card on the terminal after the user purchases a terminal. In some other embodiments, the secure chip is preset with one or more virtual electronic cards after leaving the factory, and is preset with a card management program for managing the virtual electronic card. In this regard, it corresponds to an application scenario where the user directly configures the virtual electronic card after purchase. FIG. 3 is a flowchart of a method for managing a virtual electronic card provided by an embodiment of the present disclosure. The method is applicable to a secure chip. Referring to FIG. 3, the method includes the following steps:

Step 301: The secure chip receives a download instruction from a preset device.

In a production stage of the secure chip, the secure chip may receive the download instruction sent by the preset device, where the download instruction is used to instruct the secure chip to download the installation package of the card management program from the preset device. The preset device is configured to send the download instruction to the secure chip in the production stage of the secure chip. The preset device may be a notebook computer, an industrial computer, a portable device or other device with instruction sending and data communication functions. In addition to being configured to sending a download instruction, the preset device may also be used as a debugging/testing tool for debugging and performance testing of the secure chip in the chip production stage.

In the production stage of the secure chip in the factory, a boot program of the secure chip may burn the chip operating system (COS), and the preset device may directly send the download instruction to the chip operating system without passing through the trusted service manager.

Step 302: The secure chip downloads the installation package of the card management program from the preset device based on the download instruction.

After receiving the download instruction from the preset device, the secure chip downloads the installation package of the card management program from the preset device.

Step 303: The secure chip installs at least one card management program based on the acquired installation package.

After the secure chip downloads the installation package of the card management program from the preset device, the chip operating system of the secure chip installs one or more card management programs on the secure chip based on the downloaded installation package. The number of card management programs installed on the secure chip is determined by the number of virtual electronic cards that need to be preset on the secure chip, because each virtual electronic card corresponds to one card management program, and different virtual electronic cards correspond to different card management programs.

Step 304: The card management program creates the virtual electronic card on the secure chip.

For each card management program installed on the secure chip, the card management program may call a card creation command in the card management system on the secure chip, and the card management system executes the card creation command to create one virtual electronic card in a virtual electronic card storage area on the secure chip.

Step 305: registering a matching relationship between the card management program and the virtual electronic card in a registry of the chip operating system.

It should be noted that the above steps 303-305 refer to steps 202-204 in the foregoing embodiment, but the above steps 303-305 are usually completed in the production stage of the secure chip.

Step 306: The secure chip sends information of the virtual electronic card to the trusted mobile application on the terminal.

After the secure chip is installed on the terminal, the trusted mobile application on the terminal acquires the information of each virtual electronic card preset on the secure chip, in response to the user's trigger of acquiring preset virtual electronic card information, so as to facilitate managing each virtual electronic card and the card management program on the secure chip.

It should be noted that the secure chip not only provides a program interface that may be called by the trusted mobile application, but also provides a preset interface that may be called by the preset device. The trusted mobile application may send data to the secure chip through the program interface, such as sending the installation package of the card management program and the management request. The preset device may send the download instruction to the secure chip through the preset interface, and in response to a request of the secure chip, send the installation package of the card management program to the secure chip.

Step 307: The secure chip receives the management request from the trusted mobile application.

Step 308: determining the target card management program based on the management request.

Step 309: The secure chip calls, through the target card management program, a card management command in a card management system, to manage the target virtual electronic card.

It should be noted that the above steps 307-309 refer to steps 205-207 in the foregoing embodiment.

In addition, it should be noted that after the card management program is installed on the secure chip and the virtual electronic card is created through the card management program, the virtual electronic card may be managed multiple times through the card management program. It is not necessary to perform the steps of acquiring the installation package and installing the card management program every time the virtual electronic card is managed.

On the basis of the above embodiments, the card management system on the secure chip may be implemented by C language, and the card management program installed on the secure chip may be implemented by Java.

Since C language and Java support mutual calling, and C language has a faster running speed than Java, the implementation of the card management system on the secure chip through C language may improve an efficiency of managing the virtual electronic card. In addition, the card management program previously developed through Java may be continuously used to improve the applicability of the method for managing a virtual electronic card.

Figure 4:
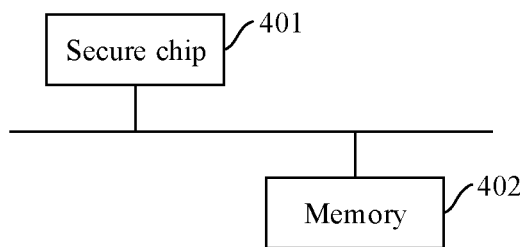
FIG. 4 is a schematic diagram of a terminal provided by an embodiment of the present disclosure.

FIG. 4 is a schematic diagram of a secure chip provided by an embodiment of the present disclosure. Referring to FIG. 4, a secure chip 401 is located in a terminal and is connected to a memory 402 in the terminal. The memory 402 stores instructions executable by the secure chip 401. The instructions are executed by the secure chip 401, so that the secure chip 401 can perform the method for managing a virtual electronic card provided by any one of the foregoing embodiments.

It is not difficult to find that the present embodiment is an apparatus embodiment corresponding to the foregoing embodiment of the method for managing a virtual electronic card, and the present embodiment may be implemented in cooperation with the foregoing embodiment of the method for managing a virtual electronic card. The related technical details mentioned in the foregoing embodiment of the method for managing a virtual electronic card are still valid in the present embodiment, and in order to reduce repetition, detailed description thereof will be omitted. Correspondingly, the related technical details mentioned in the present embodiment may also be applicable to the foregoing embodiment of the method for managing a virtual electronic card.

Another embodiment of the present disclosure provides a terminal. Referring to FIG. 4, the terminal includes: a secure chip 401, and a memory 402 connected to the secure chip 401.

The memory and the secure chip are connected by a bus. The bus may include any number of interconnected buses and bridges. The bus connects one or more secure chips and various circuits of the memory together. The bus may also connect various other circuits such as peripheral devices, voltage regulators, or power management circuits together, which are well known in the art, and therefore, will not be further described herein. A bus interface provides an interface between the bus and a transceiver. The transceiver may be one element or a plurality of elements, such as a plurality of receivers and transmitters, providing a unit for communicating with various other apparatuses on a transmission medium. Data processed by the secure chip is transmitted on a wireless medium through an antenna, and further, the antenna also receives the data and transmits the data to the secure chip.

The secure chip is responsible for managing the bus and general processing, and may also provide various functions, including timing, peripheral interface, voltage regulation, power management, and other control functions. The memory may be used to store data used by the secure chip when performing operations.

An embodiment of the present disclosure also provides a computer readable medium, the computer readable storage medium storing a computer program, the computer program, when executed by a processor, implements the method for managing a virtual electronic card provided by the above embodiments.

That is, those skilled in the art may understand that all or part of the steps in the method of the above embodiments may be implemented by instructing relevant hardware through a program. The program is stored in a storage medium and includes several instructions to cause a device (which may be a single chip computer, chip, etc.) or a processor to perform all or part of the steps of the method described in the embodiments of the present disclosure. The aforementioned storage medium includes: U disk, mobile hard disk, read-only memory (ROM), random access memory (RAM), magnetic disks or optical disks and other mediums that can store program codes.

Figure 5:
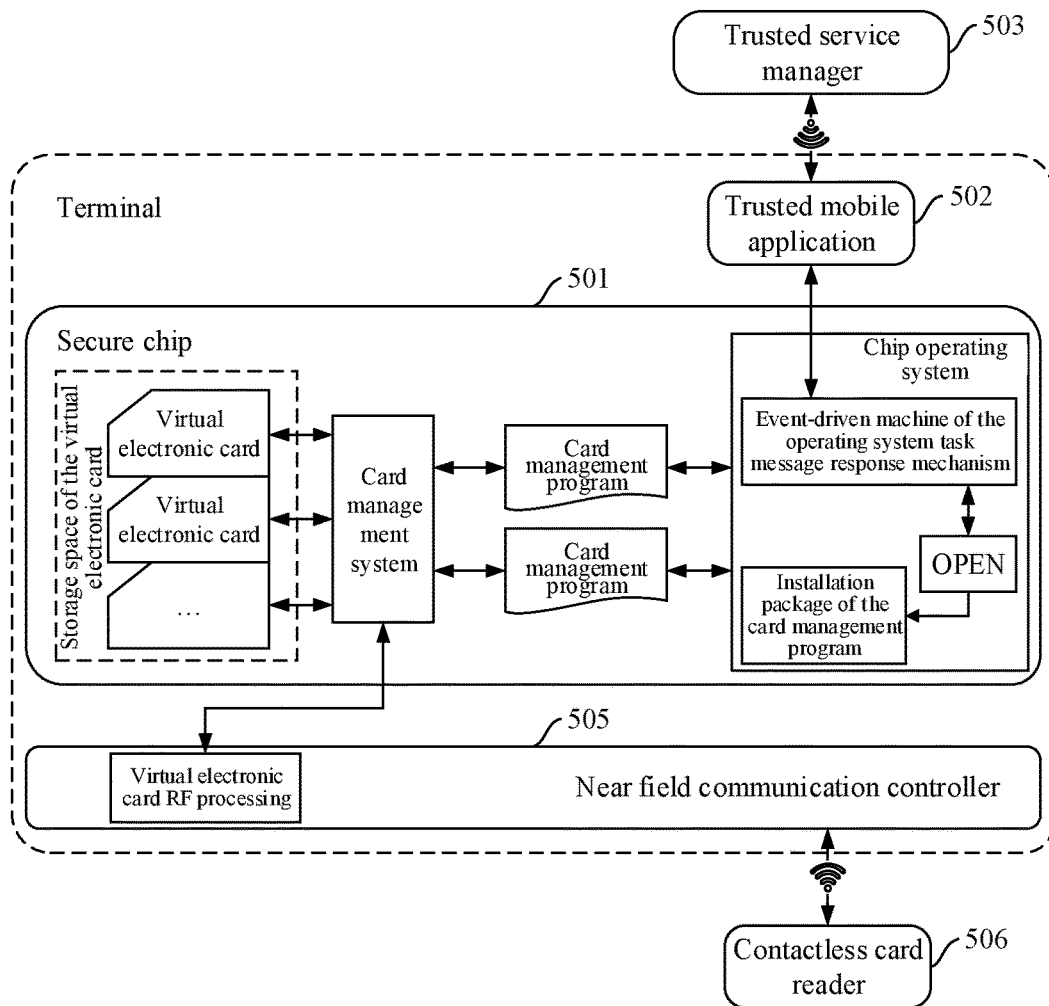
FIG. 5 is a schematic diagram of a system for managing a virtual electronic card provided by an embodiment of the present disclosure.

FIG. 5 is a schematic diagram of a system for managing a virtual electronic card provided by an embodiment of the present disclosure. Referring to FIG. 5, the system includes: a secure chip 501 and a trusted mobile application 502 provided by any one of the above embodiments;

the trusted mobile application 502 is installed on a first terminal where the secure chip 501 is located; and The trusted mobile application 502 is configured to send a management request to the secure chip 501, where the management request is used to instruct a card management program on the secure chip 501 to manage the virtual electronic card on the secure chip 501, and the different card management programs are used to manage the different virtual electronic cards.

In an embodiment of the present disclosure, at least one virtual electronic card is created on the secure chip 501, each virtual electronic card corresponds to one card management program on the secure chip, and different virtual electronic cards correspond to different card management programs. When a virtual electronic card needs to be managed, the trusted mobile application 502 on the terminal sends a management request to the secure chip 501. After the secure chip 501 sends the management request to the corresponding card management program, the card management program calls a card management command in the card management system on the secure chip 501 to manage the virtual electronic card that needs to be managed. Since permissions of each virtual electronic card are configured by the chip operating system of the secure chip 501, and other management of each virtual electronic card may be realized through the corresponding card management program, each virtual electronic card only needs to be managed by one card management program, which can reduce occupation of chip storage space by the card management program of the virtual electronic card.

The trusted mobile application 502 may generate the management request for the virtual electronic card on the secure chip 501 in response to a user's operation, and send the generated management request to the secure chip 501. The trusted mobile application 502 may also receive the management request and send the received management request to the secure chip 501. For example, the trusted mobile application 502 may forward a management request from a cloud service to the secure chip 501.

In a possible implementation, the trusted mobile application 502 is a wallet application. The trusted mobile application 502 may provide a human-computer interaction interface to facilitate the user to manage the virtual electronic card on the first terminal. Through the human-computer interaction interface provided by the trusted mobile application 502, the user "selects" any virtual electronic card on the interface and triggers a card management option, which indicates that the trusted mobile application initiates a management request, and the virtual electronic card that is "selected" is a target virtual electronic card.

Alternatively, referring to the system for managing a virtual electronic card shown in FIG. 5, the system for managing a virtual electronic card may include a trusted service manager 503 in addition to the secure chip 501 and the trusted mobile application 502. The trusted mobile application 502 may send an acquisition instruction to the trusted service manager 503. After receiving the acquisition instruction, the trusted service manager 503 may send an installation package of the card management program to the trusted mobile application 502. The trusted mobile application 502 may send the received installation package to the secure chip 501.

In a possible implementation, the trusted mobile application 502 downloads the installation package of the card management program from the trusted service manager 503 through a LOAD instruction of Global Platform, and the installation package may be a CAP package.

In an embodiment of the present disclosure, different virtual electronic cards are created and managed through different card management programs, and different card management programs may be installed based on the same installation package. The card management programs are configured differently, so that different card management programs may create and manage different virtual electronic cards. For example, different virtual electronic cards correspond to different card identifiers. By associating different card identifiers with different card management programs, different card management programs create and manage different virtual electronic cards. The installation package for installing the card management program is stored on the trusted service manager 503, and the trusted service manager 503, in response to the acquisition instruction of the trusted mobile application 502, sends the installation package of the card management program to the trusted mobile application 502. Storing the installation package of the card management program on the trusted service manager 503 may centrally manage and control the installation package of the card management program. When the card management program needs to be updated, only the installation package on the trusted service manager 503 needs to be updated, facilitating the management of the card management program. In addition, the user may download the installation package of the card management program from the trusted service manager 503 at any time while using the terminal, so as to realize the creation of a virtual electronic card on the terminal, thereby improving user experience.

It should be noted that the trusted service manager 503 provides a system having functions such as application issuance management and secure chip management, which is used to solve the storage of security data and the issuance of applications. It contains two parts: SP-TSM (Service Provider) and SEI-TSM (Secure Module Provider). SEI-TSM is the TSM of a secure chip issuer, responsible for managing the secure chip, creating secure domains and managing domain keys. SP-TSM is the TSM of a service provider, responsible for managing services and managing data in assigned secure domains. Software implementation on the TSM is mainly divided into the following two parts: downloading the installation package through the SEI-TSM, and instantiating one or more card management programs; and personalizing a content of a corresponding virtual electronic card through the SP-TSM.

The SEI-TSM is based on eSE for management, including secure domain creation, key update, auxiliary secure domain creation, and information management and application management of SE chips. For the installation package of the card management program obtained from the service provider, downloading/installing/deleting/instantiating, etc. belong to the application management of the SEI-TSM. The SEI-TSM communicates with the terminal according to a HTTP protocol. After receiving an instruction, the terminal parses and encapsulates the instruction into a frame format defined by the NFCC or the eSE and forwards it to the NFCC or the eSE for processing.

The SP-TSM provides application issuance management to solve personalized management of data of the virtual electronic card. Application personalization operations include data such as content information of the virtual electronic card. After the card management program is successfully installed through the SEI-TSM, the virtual electronic card inside the eSE may be personalized through a personalization instruction sent to the application by the TSM. The steps of personalization are, first, establishing a secure channel for security authentication; then, a personalization module organizing personalization data: including application information, keys; and finally, the personalization module sending the personalization instruction to the eSE.

In an embodiment of the present disclosure, the trusted mobile application 502 may send the acquisition instruction to the trusted service manager 503 in response to the user's operation or feedback from the secure chip 501. The trusted service manager 503 may generate the management request in response to the received acquisition instruction, and send the generated management request to the trusted mobile application 502. The trusted mobile application 502 may send the received management request to the secure chip 501, and the corresponding card management program on the secure chip 501 may manage the corresponding virtual electronic card based on the management request.

Figure 6:
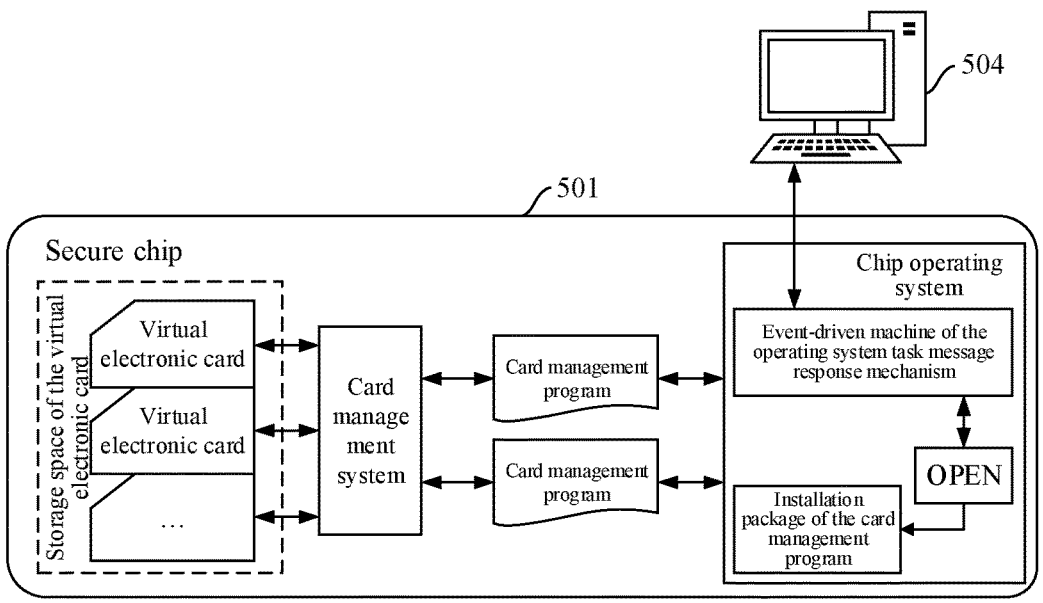
FIG. 6 is a schematic diagram of another system for managing a virtual electronic card provided by an embodiment of the present disclosure.

Alternatively, referring to the system for managing a virtual electronic card shown in FIG. 6, the system for managing a virtual electronic card may include a preset device 504 in addition to the secure chip 501 and the trusted mobile application 502. The preset device 504 may send a download instruction to the secure chip 501 in a production stage of the secure chip 501, and the secure chip 501 may download the installation package of the card management program from the preset device 504 in response to the download instruction. In addition to being configured to send a download instruction, the preset device may also be used as a debugging/testing tool for debugging and performance testing of the secure chip in the chip production stage.

In an embodiment of the present disclosure, in the production stage of the secure chip 501 in the factory, the preset device 504 may send the download instruction to the secure chip 501, so that the secure chip 501 downloads the installation package of the card management program from the preset device 504. After downloading the installation package of the card management program, the secure chip 501 may install the card management program based on the downloaded installation package, and create the virtual electronic card through the card management program, so that the virtual electronic card is preset in the secure chip 501. When the virtual electronic card is preset in the secure chip in the terminal, the user may use the virtual electronic card in the secure chip after configuring, which may improve the user experience and also meet individual needs of different terminal manufacturers.

In an embodiment of the present disclosure, in the production stage of the secure chip 501 in the factory, a boot program of the secure chip 501 may burn the chip operating system (COS), and the preset device 504 may directly send the download instruction to the chip operating system without passing through the trusted service manager 503, so as to download the installation package of the card management program to the secure chip 501.

Alternatively, referring to the system for managing a virtual electronic card shown in FIG. 5, the system may further include a near field communication controller 505. The near field communication controller 505, the secure chip 501 and the trusted mobile application 502 are all located on the first terminal. The near field communication controller 505 performs near field communication with a contactless card reader 506 to generate a contactless operation command. The near field communication controller 505 sends the generated contactless operation command to the secure chip 501. Based on the received contactless operation command, the secure chip 501 performs read and write operations on the virtual electronic card, obtains feedback information for the read and write operations on the virtual electronic card, and sends the obtained feedback information to the contactless card reader 506. The contactless card reader 506 completes corresponding subsequent card swiping based on the received feedback information.

In an embodiment of the present disclosure, through data interaction between the secure chip 501 and the near field communication controller 505, the virtual electronic card is authenticated, read, and written through NFC, so that the user may swipe the virtual electronic card in a contactless mode.

In an embodiment of the present disclosure, contactless communication of the virtual electronic card in the secure chip 501 is performed based on an SPI2 protocol between the chip operating system of the secure chip 501 and an operating system of the near field communication controller 505. The authentication, read and write instructions of the virtual electronic card are encapsulated in an SPI2 instruction frame. After the chip operating system receives the contactless operation command of the operating system of the near field communication controller 505, first the contactless operation command is encrypted and decrypted by the SPI2 and then transferred to DMA. DMA directly transfers the data to the memory of the secure chip without passing through the CPU, and then starts an interrupt service program. The card management system executes to process the contactless operation command of the virtual electronic card, to perform read operation or write operation on the virtual electronic card. After the contactless operation command is processed and completed, the returned feedback information is directly transferred from the memory of the secure chip to the register of the SPI2 via DMA, and sent to the operating system of the near field communication controller 505 after the SPI2 encryption and decryption operations.

Alternatively, referring to the system for managing a virtual electronic card shown in FIG. 5, the near field communication controller 505 may read the personalization data from a physical card, and send the read personalization data to the card management system on the secure chip 501. The card management system may forward the personalization data from the near field communication controller 505 to the trusted mobile application 502. The trusted mobile application 502 may send the personalization data from the secure chip 501 to the trusted service manager 503. The trusted service manager 503 may generate the management request including the received personalization data, and send the generated management request to the trusted mobile application 502. After the trusted mobile application 502 sends the management request from the trusted service manager 503 to the secure chip 501, the secure chip 501 personalizes the virtual electronic card through the personalization data in the management request.

In an embodiment of the present disclosure, the near field communication controller 505 reads the personalization data in the physical card, and the personalization data is uploaded to the trusted service manager 503 via the secure chip 501 and the trusted mobile application 502.

The trusted service manager 503 sends the management request including the personalization data to the secure chip 501 through the trusted mobile application 502, and the secure chip 501 stores the personalization data in the management request in the virtual electronic card, realizing a function of copying the physical card. A physical access card, a loyalty card, etc. may be converted into a virtual electronic card on the terminal, which can improve user experience.

Alternatively, based on the system for managing a virtual electronic card described in FIG. 5, the trusted service manager 503 may receive personalization data from a second terminal, generate the management request including the received personalization data, and send the generated management request to the trusted mobile application 502. After the trusted mobile application 502 sends the management request from the trusted service manager 503 to the secure chip 501, the secure chip 501 personalizes the virtual electronic card through the personalization data in the management request.

In an embodiment of the present disclosure, the trusted mobile application on one terminal may upload the personalization data of the virtual electronic card to the trusted service manager, and the trusted service manager may send the personalization data to another terminal. In this way, the virtual electronic card may be moved in and out between different terminals, so that the user may move the virtual electronic card on an original mobile phone to a new mobile phone after changing the mobile phone, thereby further improving the user experience.

In an embodiment of the present disclosure, the trusted mobile application 502 may provide a human-computer interaction interface for managing the virtual electronic card. The trusted mobile application 502 may realize communicate between the near field communication controller 505, the secure chip 501, and the trusted service manager 503 through a software interface provided by an Android system architecture. The Android system architecture provides an open mobile application program interface (Open Mobile API, OMAPI) framework, provides an interface for the trusted service manager 503 to report read virtual electronic card information, an interface for receiving a message flow of the trusted service manager 503, and an interface that transmits instructions of an application protocol data unit (APDU) to a card management program in the secure chip 501. Functions that the trusted mobile application 502 can implement include:

(1) acquiring a list of published applications: The trusted mobile application 502 accesses a backend of the trusted service manager 503 through a service interface of the trusted service manager 503, acquires a list of available virtual electronic cards, and displays the acquired list of available virtual electronic cards on an interface of the trusted mobile application 502.

(2) downloading and installing a card management program to the secure chip 501 (that is, over-the-air card OTA), or deleting an installed card management application in the secure chip 501, etc. The trusted mobile application 502 interacts according to a defined instruction format through the service interface of the trusted service manager 503, so that the virtual electronic card is installed into the secure chip 501 through the trusted service manager 503.

(3) setting a default card management program to realize a user card swiping function such as offline swiping. After the user selects a virtual electronic card through the interface of the trusted mobile application 502, the trusted mobile application 502 may set the card management application of the virtual electronic card in the secure chip 501 to be selected by sending a frame encapsulating an APDU instruction of the Global Platform. At the same time, if the virtual electronic card is not contactless activated, the trusted mobile application 502 may also set the card management program as contactless activation through a GET STATUS instruction of a CRS application. Finally, a virtual electronic card in the secure chip 501 is selected for contactless communication through the card management program.

(4) a function of moving in and out of a plurality of virtual electronic cards between different mobile phones. A management page of each virtual electronic card in the trusted mobile application 502 has a sub-interface that can be moved into, in which card data that can be moved into on the trusted service manager 503 is displayed through a list. When moving into the virtual electronic card, first, data of a certain card on the trusted service manager 503 is copied to a new mobile phone through the trusted mobile application 502. When moving out, the virtual electronic card in the secure chip 501 is copied to the trusted service manager 503 through the trusted mobile application 502, including the personalization data for subsequent moving in use.

(5) a function of copying the physical card, copying an existing physical access card, loyalty card, etc., and converting into a virtual electronic card. To copy a physical access card to the secure chip 501, first, the trusted mobile application 502 reads personalization data of the card through the near field communication controller 505. Then, the personalization data is uploaded to the backend of the trusted service manager 503 through the mobile phone, and then sent to the secure chip 501 to generate a new card management program and the virtual electronic card.

In an embodiment of the present disclosure, referring to FIG. 5 and FIG. 6, the operations in the chip operating system of the secure chip are controlled within a storage range defined by the system. The chip operating system provides a basic card application function interface and a communication interface for each virtual electronic card. The chip operating system meets the Global Platform and Java card specifications, and is compatible with contact and contactless smart card applications of different protocol types.

The chip operating system on the secure chip 501 is configured to implement the following processing: power management (power on/off, low power management, etc.), message task processing mechanism, synchronization of system activities and communication, memory management (allocation, tear-proof, atomic write, resource recovery, etc.) and so on. The secure chip 501 may also implement basic functions of the latest Java card 2.3.1 and Global Platform 2.3.1 OPEN. The card management program is one or more Applets on OPEN. The chip operating system may allocate YulaAppID (a program identifier) to the card management program, and YulaAppID may correspond to a card identifier of a virtual electronic card in the card management system.

In an embodiment of the present disclosure, the card management system on the secure chip 501 supports an ISO/IEC 14443-3 A function. The card management system implements contact and contactless data interaction functions of the virtual electronic card, including memory management, UID allocation, RF authentication, read and write communication, etc. of a plurality of virtual electronic cards. The card management system is implemented by C language, and the card management program is implemented by Java. C language and Java support mutual calling.

A communication module of the chip operating system communicates with the NFCC or a mobile communication device through an SPI bus, and realizes reception and processing of an APDU instruction transmitted by the mobile communication device. Through the SPI2 and a stream encryption interface with CRYPTO1, RF communication is realized between the virtual electronic card and the reader, for CLT (Contactless Tunnel) frame plaintext and ciphertext data exchange.

The following describes an entire process of starting and initializing the chip operating system until it reaches an idle status. First, after the secure chip is powered on, the chip operating system is initialized, including initialization of the memory, a clock, an interrupt, peripherals, and an operating system task message response mechanism, and whether the card management system is enabled in a boot program of the chip operating system is checked, as well as initialization of RAM, ROM, NVM occupied after enabling, and the status of the virtual electronic card is compared for initialization. The operating system task message response mechanism is a multi-task operating system architecture with task as the smallest unit. The chip operating system includes 1 system task, 2 application tasks, 2 input and output peripheral tasks, and 1 idle task. Tasks may be set with different priorities, tasks supporting high-priority preempt priority execution, and preempted tasks may hang. Then, the card management program indirectly manages the virtual electronic card through application general commands INTSALL, PERSONLIZATION, DELETE, etc. defined by Global Platform specifications. At the same time, the card management program supports private APDU instructions, allowing the mobile communication device to perform read and write operations on the virtual electronic card. In addition to the above functions, the chip operating system may also perform functions of the operating system other than OPEN, such as memory supervision, or permission management. Finally, the chip operating system exchanges data with other chips through the SPI and the SPI2. A main difference between the SPI and the SPI2 is that the SPI2 contains a CRYPTO1 stream encryption function. Contactless communication authentication of the virtual electronic card and encryption and decryption of the read and write instructions are directly processed in the interrupt of the SPI2.

In an embodiment of the present disclosure, the trusted mobile application selects the CRS application in the eSE, and acquires parameters of all virtual electronic cards installed in the secure chip through the GET STATUS command of the CRS application, including contactless parameters such as ATQA, SAK, and UID. Then, the trusted mobile application calculates and combines the parameters of the virtual electronic cards through rules of intelligent routing. Finally, the trusted mobile application sends the calculated card parameters to the NFCC. In the case of intelligent routing, when the number of virtual electronic cards is more than one, if the contactless parameters between the virtual electronic cards are in conflict (such as the same UID), the trusted mobile application may send multiple sets of parameters to the operating system of the NFCC. In the case of non-intelligent routing, the trusted mobile application selects one virtual electronic card as the default card, and sends parameters of this default card to the operating system of the NFCC.

When the contactless card reader reads the card, first, it reads the card parameters in the operating system of the NFCC to perform a contactless card-seeking operation. When a card with determined UID is identified by the contactless reader, if it is not an intelligent routing, the reader may directly interact with the virtual electronic card selected by default in the chip operating system; if it is an intelligent routing, the corresponding virtual electronic card in the chip operating system is selected for communication based on a mapping relationship between the UID of the currently identified card and an AID (program identifier) of the corresponding card management program.

The operation on the virtual electronic card on the operating system of the NFCC, regardless of whether it is an intelligent routing, the virtual electronic card must be selected through the existing system to ensure that finally the contactless card reader can find the correct and unique virtual electronic card in the chip operating system for data exchange.

It should be noted that the method and system for managing a virtual electronic card provided by the above embodiments may be used to manage a Yula card. Yula card application is a smart card application protocol with read/write capabilities supporting the ISO14443-3 protocol and works in a 13.56 MHz frequency range. Correspondingly, when the Yula card is managed by the method provided in the above embodiments or the same, the chip operating system of the secure chip may be a Great Wall eSE chip operating system, the operating system of the NFCC may be Pyramid, and the operating system task message response mechanism may be Event Driven Architecture (EDA).

It should be noted that the embodiments of the system for managing a virtual electronic card and the embodiments of the method for managing a virtual electronic card are based on the same concept. For interaction between the various parts in the system embodiments, reference may be made to the description in the foregoing method embodiments, and detailed description thereof will be omitted.

Finally, it should be noted that the above embodiments are only used to illustrate the technical solution of the embodiments of the present disclosure, but not to limit the technical solution. Although the embodiments of the present disclosure have been described in detail with reference to the foregoing embodiments, those of ordinary skill in the art should understand that they can still modify the technical solution described in the foregoing embodiments, or equivalently replace some of the technical features. These modifications or replacements do not deviate from the spirit and scope of the technical solution of the embodiments of the present disclosure in the essence of the corresponding technical solution.

What is claimed is:

1. A method for managing a virtual electronic card, applied to a secure chip installed in a first terminal, the method comprising:
   receiving, by a chip operating system of the secure chip, a management request from a trusted mobile application on the first terminal, the management request being used to manage a target virtual electronic card in at least one virtual electronic card in the secure chip, and permissions of the virtual electronic card being configured by the chip operating system of the secure chip;
   determining, by the chip operating system of the secure chip, from at least one card management program in the secure chip, a target card management program corresponding to the target virtual electronic card, each of the at least one virtual electronic card corresponding to one of the at least one card management program, and different virtual electronic cards corresponding to different card management programs;
   sending, by the chip operating system of the secure chip, the management request to the target card management program; and
   calling, through the target card management program in the secure chip, a card management command corresponding to the management request in a card management system in the secure chip, to manage the target virtual electronic card, wherein the card management system is deployed in the secure chip, and provides card management commands for managing the virtual electronic card.

2. The method according to claim 1, wherein the method further comprises creating the target virtual electronic card, and the creating the target virtual electronic card comprises:
   acquiring, by the chip operating system of the secure chip, an installation package of the card management program;
   installing, by the chip operating system of the secure chip, the target card management program in the secure chip based on the installation package; and
   calling, through the target card management program, a card creation command in the card management system, to create the target virtual electronic card in the secure chip.

3. The method according to claim 2, wherein the acquiring, by the chip operating system of the secure chip, an installation package of the card management program, comprises:
   acquiring the installation package from a trusted service manager through the trusted mobile application.

4. The method according to claim 2, wherein the acquiring, by the chip operating system of the secure chip, an installation package of the card management program, comprises:
   downloading the installation package from a preset device in a production stage of the secure chip.

5. The method according to claim 1, wherein the method further comprises:
   allocating, by the chip operating system of the secure chip, a target program identifier to the target card management program, wherein the different card management programs correspond to different program identifiers;

allocating, by the chip operating system of the secure chip, a target card identifier to the target virtual electronic card, wherein the different virtual electronic cards correspond to different card identifiers; and registering, by the chip operating system of the secure chip, a matching relationship between the target program identifier and the target card identifier in a registry of the chip operating system.

6. The method according to claim 5, wherein the determining, by the chip operating system of the secure chip, from at least one card management program in the secure chip, a target card management program corresponding to the target virtual electronic card, comprises:

acquiring the target card identifier carried in the management request;

determining the target program identifier that matches the target card identifier, based on the matching relationship between the program identifier and the card identifier registered in the registry; and determining the card management program corresponding to the target program identifier as the target card management program corresponding to the target virtual electronic card.

7. The method according to claim 6, wherein the card management command comprises a personalization command, a delete command, an activation command, or a read and write command;

the personalization command is used to instruct the target card management program to store personalization data carried in the management request in the target virtual electronic card;

the delete command is used to instruct the target card management program to delete the target virtual electronic card;

the activation command is used to instruct the target card management program to set the target virtual electronic card to a contactless activation status; and the read and write command is used to instruct the target card management program to read and write a content of the target virtual electronic card.

8. The method according to claim 7, wherein the card management command comprises the personalization command, the personalization data is read from a physical card by a near field communication controller, the personalization data is sent to the trusted mobile application by the card management system, the personalization data is sent by the trusted mobile application to a trusted service manager, the trusted service manager generates the management request comprising the personalization data, and the trusted service manager sends the management request to the trusted mobile application;

or, the personalization data is sent to the trusted service manager by a second terminal, the trusted service manager generates the management request comprising the personalization data, and the trusted service manager sends the management request to the trusted mobile application, wherein the first terminal and the second terminal are different terminals.

9. The method according to claim 1, wherein the method further comprises:

receiving, by the card management system in the secure chip, a contactless operation command from a near field communication controller, wherein the contactless operation command is generated based on near field communication between the near field communication controller and a contactless card reader;

executing, by the card management system in the secure chip, the contactless operation command to perform read and write operations on the target virtual electronic card;

acquiring, by the card management system in the secure chip, feedback information after the card management system performs the read and write operations on the target virtual electronic card; and sending, by the card management system in the secure chip, the feedback information to the near field communication controller.

10. The method according to claim 9, wherein the method further comprises:

decrypting, by the card management system in the secure chip, the contactless operation command through a serial peripheral interface SPI2;

transmitting, by the card management system in the secure chip, the decrypted contactless operation command to a memory of the secure chip through a direct memory access (DMA) controller;

wherein the sending, by the card management system in the secure chip, the feedback information to the near field communication controller, comprises:

transmitting the feedback information in the memory of the secure chip to a register of the serial peripheral interface SPI2 through the DMA controller;

encrypting the feedback information through the serial peripheral interface SPI2; and sending the encrypted feedback information to the near field communication controller.

11. The method according to claim 1, wherein the card management system is implemented by C language, and the card management program is implemented by Java.

12. A secure chip including a chip operating system, the secure chip being located in a terminal and connected to a memory in the terminal, the memory storing instructions executable by the secure chip, wherein the instructions, when executed by the secure chip, perform a method for managing a virtual electronic card, comprising:

receiving, via the chip operating system, a management request from a trusted mobile application on the first terminal, the management request being used to manage a target virtual electronic card in at least one virtual electronic card in the secure chip, and permissions of the virtual electronic card being configured by a chip operating system of the secure chip;

determining, via the chip operating system, from at least one card management program in the secure chip, a target card management program corresponding to the target virtual electronic card, each of the at least one virtual electronic card corresponding to one of the at least one card management program, and different virtual electronic cards corresponding to different card management programs;

sending, via the chip operating system, the management request to the target card management program; and calling, through the target card management program in the secure chip, a card management command corresponding to the management request in a card management system in the secure chip, to manage the target virtual electronic card, wherein the card management system is deployed in the secure chip, and provides card management commands for managing the virtual electronic card.

13. The secure chip according to claim 12, wherein the method further comprises creating the target virtual electronic card, and the creating the target virtual electronic card comprises:
- acquiring an installation package of the card management program;
- installing the target card management program in the secure chip based on the installation package; and
- calling, through the target card management program, a card creation command in the card management system, to create the target virtual electronic card in the secure chip.

14. The secure chip according to claim 13, wherein the acquiring an installation package of the card management program, comprises:
- acquiring the installation package from a trusted service manager through the trusted mobile application.

15. A first terminal, comprising:
- a memory storing instructions;
- a secure chip comprising a chip operating system and connected to the memory, the instructions when executed by the secure chip, perform a method for managing a virtual electronic card comprising:
  - receiving, via the chip operating system, a management request from a trusted mobile application on the first terminal, the management request being used to manage a target virtual electronic card in at least one virtual electronic card in the secure chip, and permissions of the virtual electronic card being configured by a chip operating system of the secure chip;
  - determining, via the chip operating system, from at least one card management program in the secure chip, a target card management program corresponding to the target virtual electronic card, each of the at least one virtual electronic card corresponding to one of the at least one card management program, and different virtual electronic cards corresponding to different card management programs;
  - sending, via the chip operating system, the management request to the target card management program; and
  - calling, through the target card management program in the secure chip, a card management command corresponding to the management request in a card management system in the secure chip, to manage the target virtual electronic card, wherein the card management system is deployed in the secure chip, and provides card management commands for managing the virtual electronic card; and
- a near field communication controller, wherein the near field communication controller is configured to generate a contactless operation command based on near field communication between the near field communication controller and a contactless card reader, and send the contactless operation command to the secure chip; and the near field communication controller is further configured to receive feedback information after the secure chip executes the contactless operation command, and send the feedback information to the contactless card reader through near field communication.

16. The first terminal according to claim 15, wherein, the near field communication controller is further configured to read personalization data from a physical card, and send the read personalization data to the trusted mobile application.

\* \* \* \* \*